(12) United States Patent
Prakash et al.

(10) Patent No.: US 8,385,558 B2
(45) Date of Patent: *Feb. 26, 2013

(54) ECHO PRESENCE DETERMINATION IN VOICE CONVERSATIONS

(75) Inventors: Vinod Prakash, Redmond, WA (US); Chao He, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1081 days.

This patent is subject to a terminal disclaimer.

(21) Appl. No.: 12/353,148

(22) Filed: Jan. 13, 2009

(65) Prior Publication Data

US 2010/0177884 A1    Jul. 15, 2010

(51) Int. Cl.
*A61F 11/06* (2006.01)
*G10K 11/16* (2006.01)
*H03B 29/00* (2006.01)

(52) U.S. Cl. .................. 381/71.1; 379/406.01

(58) Field of Classification Search ............... 381/71.1; 379/406.01
See application file for complete search history.

(56) References Cited

U.S. PATENT DOCUMENTS

| | | | |
|---|---|---|---|
| 6,282,176 B1 * | 8/2001 | Hemkumar | 370/276 |
| 6,744,884 B1 * | 6/2004 | Bjarnason | 379/406.01 |
| 7,355,989 B2 | 4/2008 | Sugiyama | |
| 7,424,109 B1 | 9/2008 | Yousseff | |
| 7,643,630 B2 * | 1/2010 | McCree et al. | 379/406.08 |
| 2006/0034447 A1 * | 2/2006 | Alves et al. | 379/406.01 |
| 2007/0286404 A1 | 12/2007 | Popovic et al. | |
| 2008/0219432 A1 | 9/2008 | Ahmadi | |
| 2008/0240413 A1 | 10/2008 | Mohammad et al. | |
| 2008/0253553 A1 | 10/2008 | Li et al. | |
| 2008/0259828 A1 | 10/2008 | He et al. | |

OTHER PUBLICATIONS

Li, et al."Challenges and Solutions for Designing Software AEC on Personal Computers", Retrieved at<<http://www.engr.washington.edu/epp/iwaenc2008/proceedings/contents/papers/9044.pdf>>, pp. 4, 2008.

Stokes, et al. "Acoustic Echo Cancellation with Arbitrary Playback Sampling Rate", Retrieved at<<http://research.microsoft.com/users/jstokes/AEC_Inter_ICASSP04.pdf>>, pp. 4, Feb. 2004.

Avendano, et al."STFT-based Multi-Channel Acoustic Interference Suppressor", Retrieved at<<http://www.atc.creative.com/algorithms/ieee-suppressor.pdf>>, pp. 4, Sep. 2001.

* cited by examiner

*Primary Examiner* — Alexander Jamal
(74) *Attorney, Agent, or Firm* — Turk IP Law, LLC

(57) ABSTRACT

Presence of echo in a conversation is determined through a search performed in the sub-band domain using independent short length adaptive filters across a range of sub-band and maximum expected echo delay values. The adaptive filters attempt to predict and cancel the echo in the microphone signal based on the content in the speaker signal. If substantial cancellation is achieved in any of the sub-band filters, echo presence in the microphone signal is determined.

15 Claims, 7 Drawing Sheets

ECHO PRESENCE DETERMINATION IN VOICE CONVERSATIONS

BACKGROUND

With the proliferation of enhanced communication systems conventional communication methods such as telephone communications are being replaced with computer executed applications performing the same tasks. While some of the challenges in conventional systems, such as echo or noise, occur in computer-based enhanced systems, solutions may be designed through software and/or hardware approaches. For example, echoes are heard in the conservation through a two channel full-duplex voice communication system if strong acoustic coupling exists between transmit and receive points of a channel. An Acoustic Echo Canceller (AEC) is a signal processing technology used to remove this type of echo.

In order to provide an echo free experience, tradeoffs often need to be made that affect the full-duplex nature of a conversation. Before making such tradeoffs, it is necessary to verify echo is actually present in a conversation, this is to ensure high conversation quality is maintained under different scenarios. For example, proper AEC behavior is highly dependent on accurate alignment between speaker and microphone streams. On personal computers timestamps are typically used for this purpose. Timestamps represents the physical time of when a sample is rendered (in the speaker stream) or captured (in the microphone stream). Depending on the specific device/driver in use, the obtained timestamps may vary a lot, and due to the strong dependence of AEC on timestamps, it is important to assess a quality of the timestamps and switch to a half-duplex mode of communication in case the timestamps are determined to be too noisy. This may ensure continuation of the conversation without echo or voice distortion issues but at the cost of full-duplex behavior. This tradeoff while acceptable in cases of strong echo, may not be acceptable in cases where the device in use effectively eliminates the echo (e.g., if headphones/headsets are in use or the device has a built-in AEC).

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining presence of echo in a conversation in order to control trade-offs that may need to be made between allowing echo leak and compromising full-duplex behavior in a conversation. An echo presence search may be performed in the sub-band domain using independent short length adaptive filters across a range of sub-band and high expected echo delay values. The adaptive filters attempt to predict and cancel the echo in the microphone signal based on the content in the speaker signal. If substantial cancellation is achieved in any of the sub-band filters, a determination may be made that echo is present in the microphone signal.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, echo presence may be determined by performing a search in the sub-band domain using independent short length adaptive filters across a range of sub-bands and high expected echo delay values. Echo is determined to be present in the microphone signal if substantial cancellation is achieved in any of the sub-band filters. In the following detailed description, references are made to the accompanying drawings that form a part hereof, and in which are shown by way of illustrations, specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Figure 1:
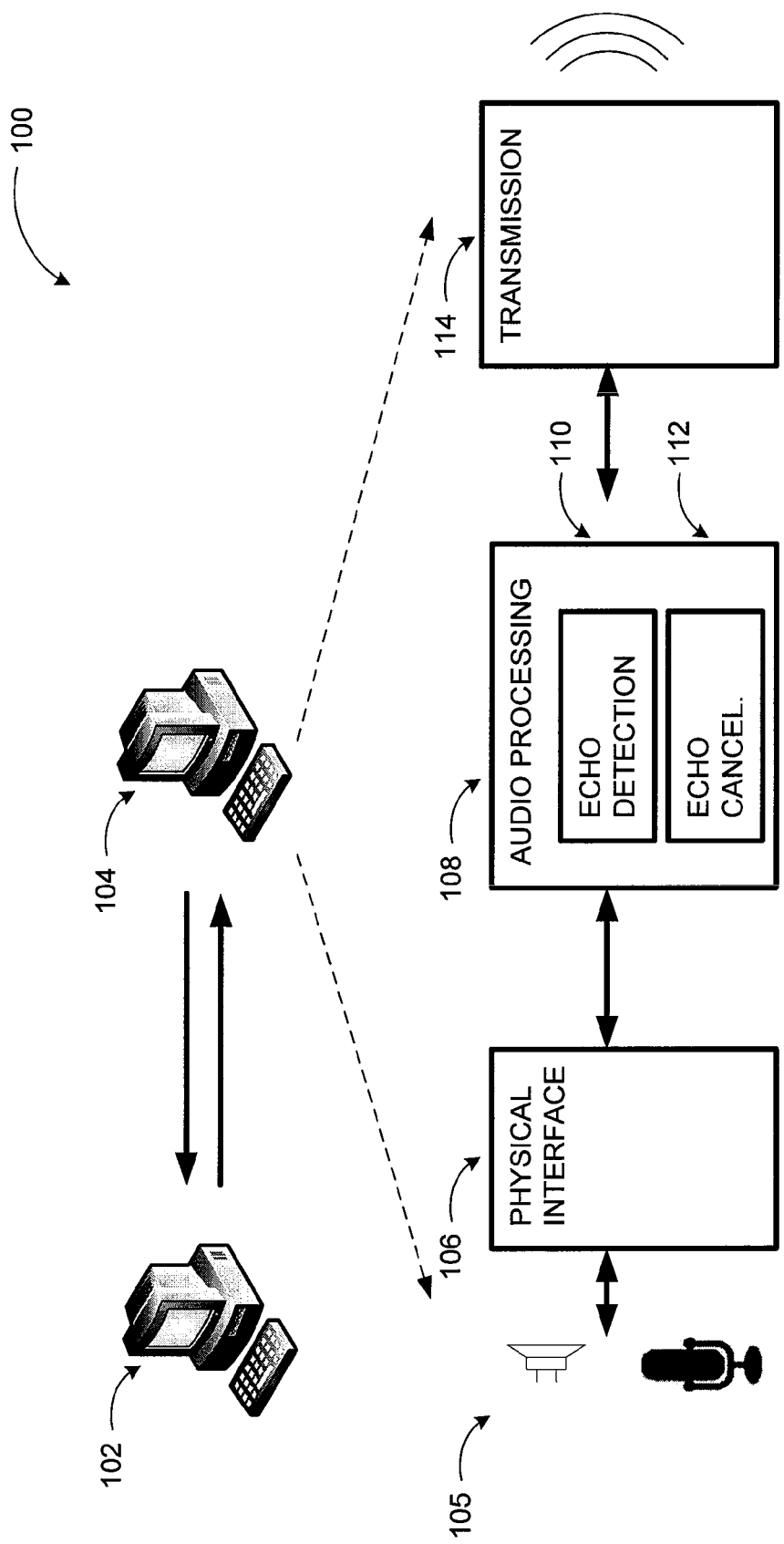
FIG. 1 is a diagram illustrating an example audio application architecture.

Referring to FIG. 1, diagram 100 of an example audio application architecture is illustrated. With the proliferation of Internet-based communication tools and applications, audio applications that provide voice communication have grown in number and variety. Such applications may be local applications residing on client devices or hosted applications executed by a service and used by a client device/application remotely. In any case, audio signals are propagated from a source device/application to the client device running the audio application, which typically processes the audio signals and renders through a rendering device. Several interfaces have become standard for simplifying the communication between the audio application and the audio rendering device.

In FIG. 1, computing device 102 represents a source for the audio signals, which may be another client device facilitating two-way communication between two users with client device 104 or a server hosting a communication application that facilitates audio (among others) communication with a user of the client device 104. Computing device 102 may also be a source for audio files that are provided to an application on client device 104 and rendered on the client device (e.g. recordings of a radio program, etc.).

As discussed above, audio applications may perform a variety of tasks associated with processing and rendering the received audio signals. Some of these tasks may also be performed by other applications, locally or remotely. A typical audio application may include an audio processing block 108 for performing digital and/or analog signal processing on received audio signals such as filtering, conditioning, biasing, etc. Audio processing block 108 may include an echo detection module 110 and an echo cancellation module 112, among other components, in a system according to embodiments. Details of such modules and their operations are discussed below.

Audio processing block 108 may be associated with physical interface 106 for receiving and preconditioning, as well as forwarding for rendering, audio signals from/to electromechanical means, such as a microphone/speaker 105. Transmission block 114 represents components (physical and/or software) of computing device 104 employed for communicating with other computing devices such as computing device 102 to facilitate two-way voice communications.

Figure 2:
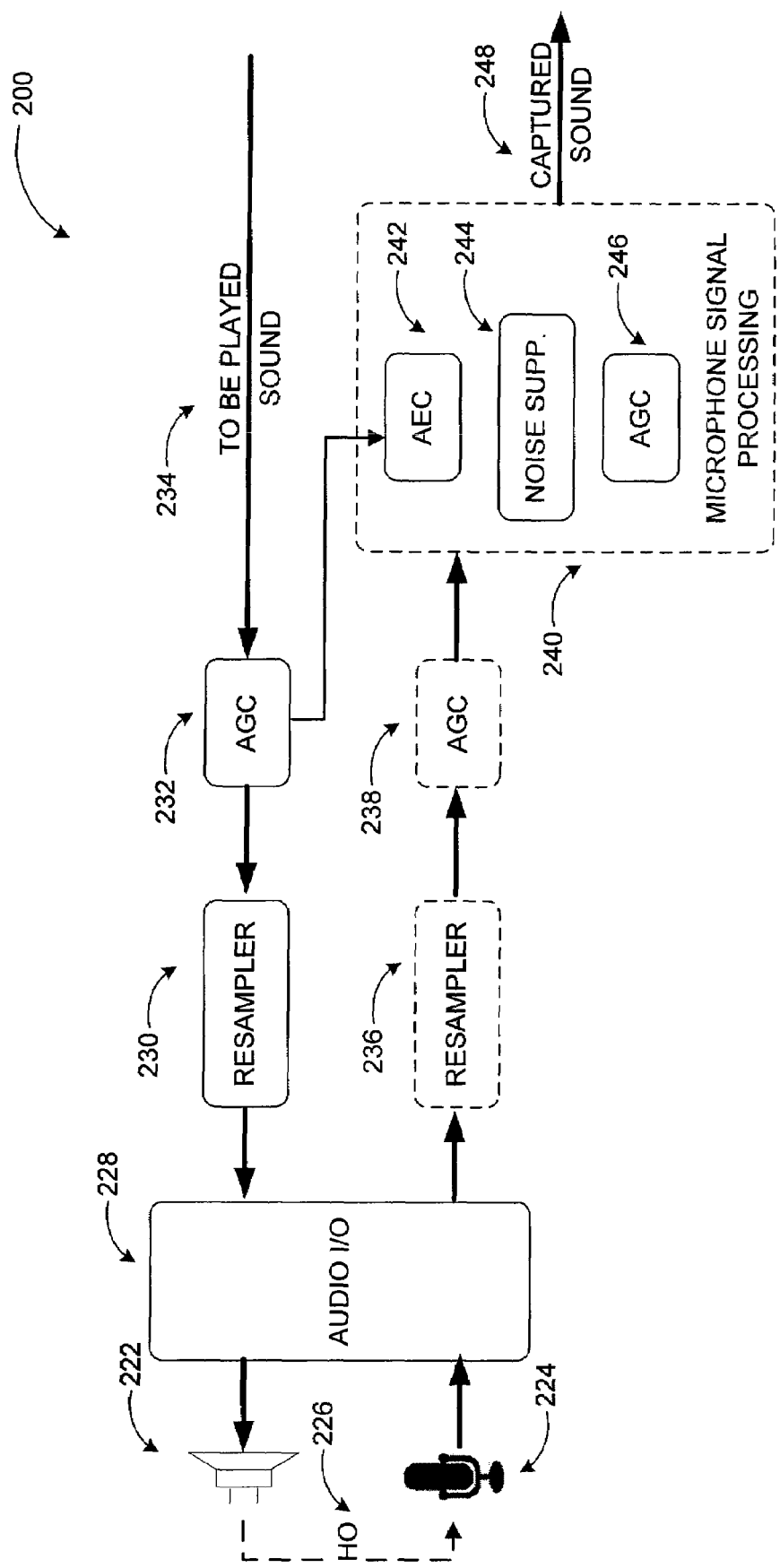
FIG. 2 illustrates example audio signal processing architecture in a two-way communication system.

FIG. 2 illustrates example audio signal processing architecture in a two-way communication system. The architecture shown in diagram 200 is designed to address problems in two-way communications such as noise, leveling, and echo. Acoustic echo 226 arises when sound from a loudspeaker 222 is picked up by the microphone 224 in the vicinity, for example, the microphone and speaker coupled to a computer. Acoustic echo 226 may also be found in other environments such as hands-free car communication systems, telephone-like communication devices, conference call systems with integrated or separate speaker/microphones, and similar systems. Acoustic echo 226 may be heard by the far end talkers in a conversation as well as the near end talker. Due to the slight round-trip transmission delay, the acoustic echo may be quite distracting.

Audio Input/Output (I/O) module 228 acts as interface between the electromechanical microphone/speaker and the remaining circuits/programs of the end device. A signal "To Be Played Sound" 234 is typically received from another end device and sampled.

An Automatic Gain Control (AGC) 232 may optionally be embodied as software, hardware, or a combination of the two, similar to many of the other components shown in diagram 200. AGC 232 is responsible for loudness adjustment and distortion control for speaker 222. AGC 232 is based on parameters like dynamic range or controls for background noise and impulse signals. The signal may be resampled after AGC 232 at resampler 230 before being presented to speaker 222 for rendering by audio I/O 228.

Audio signal received from microphone 224 may also be processed by optional resampler 236 and AGC 238 before being provided to microphone signal processing block 240. Microphone signal processing block 240 may include a number of components, some of the major ones include another AGC 246 (one AGC may be used for coarse gain control while another is used for fine gain control), noise suppression module 244 for controlling background noise picked up by the microphone, or AEC 242 for controlling acoustic echo. The processed signal is transmitted to another end device as captured sound signal 248.

An audio processing system for implementing embodiments may be designed with additional or fewer components for processing various aspects of received audio signals including filtering, digitization, digital-analog conversion, and many others. Different components, hardware or software, may be combined for efficiency and other purposes.

Figure 3:
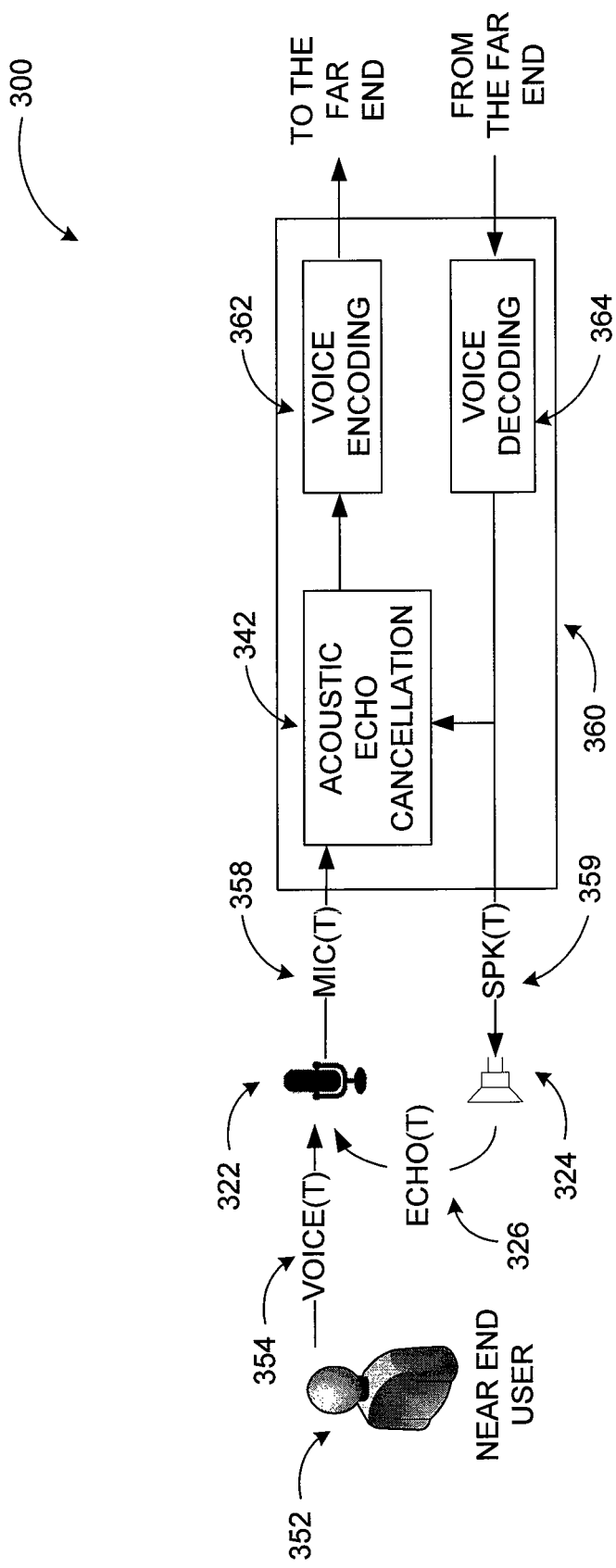
FIG. 3 illustrates an example audio signal processing path in a two-way communication system where embodiments may be implemented.

In FIG. 3, diagram 300 illustrates an example audio signal processing path in a two-way communication system where embodiments may be implemented. Acoustic Echo Cancellation (AEC) is a digital signal processing technology used to remove the echo from speaker phone in two-way or multi-way communication systems such as traditional telephone or modern internet audio conversation applications. The functional blocks shown in diagram 300 are part of one end of a typical two-way communication system according to embodiments. The other end may be configured in the same manner or differently. In such a system, the far-end voice may be played through a loud speaker 324 and captured by the microphone 322 in the system and sent back to the far end. Thus, the far-end user hears their voice with a particular delay. As discussed above, this type of echo, also called "acoustic echo" is distinct from line/network echo caused by impedance mismatch at a hybrid.

The echo 326 "echo(t)" may be modeled as a speaker signal 359 "spk(t)" convolved by a room response, which is also referred to as echo path. The echo path includes effects of delays and phase changes caused by slow speed of sound wave propagation through air and multiple reflections off walls or other surfaces. Thus, the echo 326 may be expressed as:

$$\mathrm{echo}(t) = spk(t) - g(t) = \int_0^{T_e} g(\tau) spk(t-\tau) d\tau, \qquad [1]$$

where $g(\tau)$ is room response and $T^e$ is echo length that depends on size of the room and material of reflection surfaces.

Echo cancellation has inherent challenges like determining the room response, calculating echoes, and subtracting echoes from the microphone signals. The latter one include sound signal voice(t) 354 from near end user 352 as transformed by microphone 322 into mic(t) 358. Since the echo path is highly variable, so the filter g(t) is hard to be fixed or calculated beforehand. Therefore, an adaptive algorithm may be used to adaptively find the best filter g(t) that matches the echo path in AEC module 342 of audio processing block 360. Audio processing block 360 may further include voice encoder 362 and voice decoder 364 on the transmit and receive paths, respectively.

Figure 4:
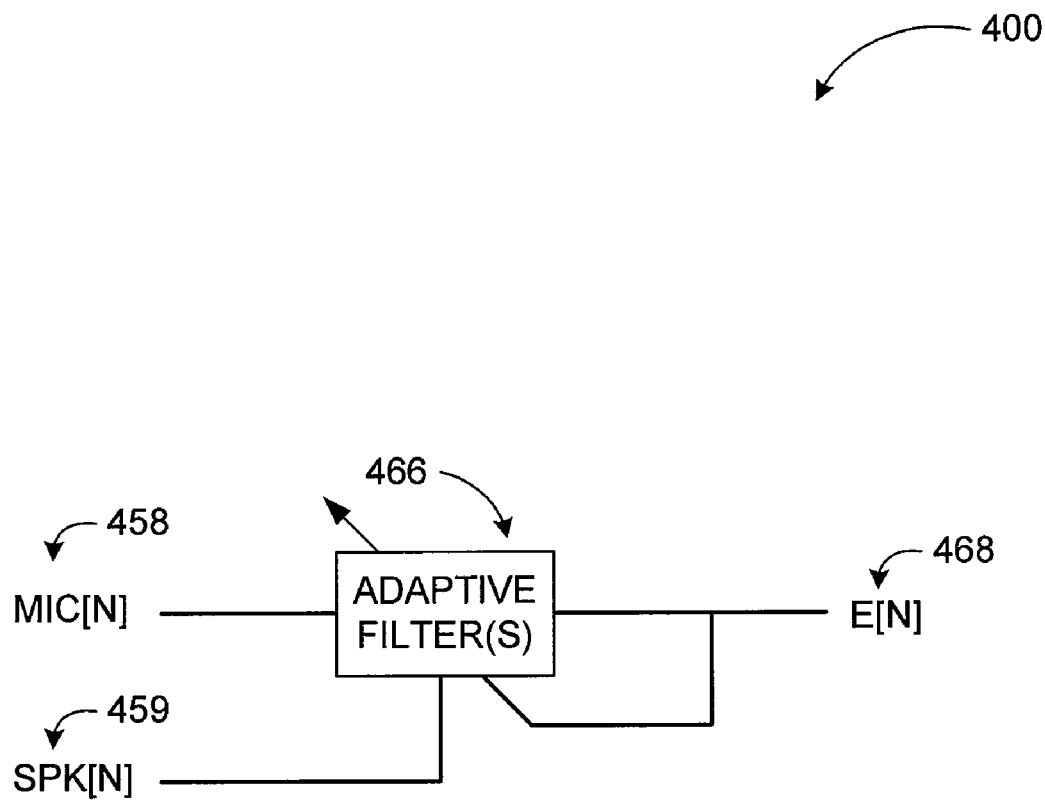
FIG. 4 illustrates an example adaptive filter that may be used in a system according to embodiments.

In reality acoustic echo cancellation is applied on sampled and digitized versions of spk(t) 359 and mic(t) 358. FIG. 4 illustrates an example adaptive filter that may be used in a system according to embodiments. Here mic[n] 458 and spk [n] 459 are digitized versions of spk(t) 359 and mic(t) 358 respectively. An adaptive filter is a filter that self-adjusts its transfer function according to an optimizing algorithm. By way of contrast, a non-adaptive filter has static filter coefficients collectively forming the transfer function.

The adaptive filter 466 attempts to predict the echo of spk[n] 459 in mic[n] 458 resulting in the output e[n] 468. An important piece of information the AEC needs to know for the prediction of the echo is the corresponding relationship between samples in the sampled microphone signal mic[n] (458) and the sampled speaker signal spk[n] (459). The AEC needs to know which samples in the speaker signal spk[n] are needed to predict the echo at a given sample in the microphone signal mic[n], so that it can cancel the echo. In practice, the AEC may operate on two streams of microphone and speaker samples, which generally are sampled by two different sampling clocks and may each be subject to delays. Accordingly, the same indices in the two streams may not necessarily be aligned in physical time. The AEC may address this issue by computing a relative sample offset (with respect to the same physical time) between the two streams. This may be computed from the timestamps of samples in both streams because timestamp represents the physical time of when a sample is rendered (in speaker stream) or is captured (in microphone stream).

A suitable timestamp compensation algorithm aligns the two data streams as optimally as possible (in the presence of glitches, clock drift, etc.) and returns spk[n] and mic[n] where the audio samples of corresponding indices are meant to refer to the same physical time. Occasionally, depending on the specific device/driver in use this information may not be accurate, such as in Bluetooth devices where the delay in the wireless link is unknown.

In an echo cancellation system utilizing sub-bands, the microphone input signal may first be passed through a bank of analysis filters $h_0, h_1, h_2, \ldots h_{K-1}$ and produce vectors of K sub-band signals. Adaptive echo cancellation may then be performed in each sub-band with the resulting sub-band error signals being passed through a bank of synthesis filters and, yielding a full band signal. In each sub-band, sampling rate may be reduced by a factor of M (decimation), because signal bandwidth is reduced. For a better stop-band rejection, M may be selected less than number of bands K.

An echo cancellation approach as described above reduces computational complexity because of the down-sampling and improves convergence rate because the sub-band signal spectra are more nearly-uniform than the full-band signal. In a system employing such an approach, the spk and mic sub-band signals after timestamp based alignment may be denoted as spk[n, k], mic[n, k] respectively, where n is the time (frame) index for sub-band processing and k is the sub-band frequency (k=0, 1, ... M-1).

A plurality of short band adaptive filters may be employed to determine presence of echo so that a decision can be made whether or not to switch to half-duplex mode or make other tradeoffs involving duplexity in order to control the echo that may leak back to the far-end. An example adaptive filter and the process of determining echo presence using such adaptive filters that operate in the sub-band domain are discussed in more detail below.

In a system according to embodiments, echo presence is predicted in the microphone signal using short length adaptive filters (e.g. length 3) of the speaker signal, essentially attempting to determine the direct path of the echo. Since the true physical delay between the timestamp adjusted speaker and microphone sub-band samples may be positive or negative, a search for this delay index is carried out by using the speaker signal delayed in either direction. Thus an algorithm according to one embodiment may begin with predicting mic[n, k] using past samples of the speaker signals {spk[n-d, k], spk[n-d-1, k], spk[n-d-2, k]}, where d=0, 1, 2, ... L0, and L0 being the required causal-delay search range. Subsequently, the algorithm may predict mic[n-d, k] using {spk[n, k], spk[n-1, k], spk[n-2, k]}, where d=1, 2, ... L1, and L1 is the required acausal-delay search range.

As a measure of the prediction ability a quantity Echo Return Loss Enhancement "ERLE" may be computed for the causal-delay case as:

$$ERLE(d, k) = \frac{\text{var}(mic[n, k])}{\text{var}(mic[n, k] - mic[n, k, d])}, \qquad [2]$$

where the variance var( ) may be computed using recursive averaging and mic[n, k, d] is the predicted mic[n, k] by the adaptive filter using {spk[n-d, k], spk[n-d-1, k], spk[n-d-2, k]}. The ERLE values for the acausal-delay case may be computed similarly.

Furthermore, for a particular delay index d, the representative ERLE may be computed as:

$$ERLE(d) = \max_k (ERLE(d, k)), \qquad [2]$$

where k ranges over the sub-bands considered. ERLE(d) may then be averaged over time to smooth out statistical variations. In order to determine if there is any echo in the microphone capture, an overall ERLE value may be calculated as the maximum of all ERLE(d) (considering both causal and acausal delay values). If this value exceeds a predefined threshold (e.g. 3 dB), echo may be declared to be present in the microphone capture, otherwise the decision may be that there is no echo present over the range of delay values considered.

While the regular AEC also uses adaptive filters to predict and cancel the echo, the echo determination procedure outlined above is more robust in cases where the regular AEC may fail. The reason is twofold: the short length adaptive filters converge very rapidly and use of multiple such filters in the sub-band domain and using the maximum obtained ERLE for the final decision provides a high tolerance toward distortions that impact various frequencies in a non-uniform manner.

The echo determination operations and approaches, as well as components of an audio glitch reduction system, described in FIG. 1-4 are exemplary for illustration purposes. A system for determining acoustic echo using sub-band filters may be implemented using additional or fewer components and other schemes using the principles described herein.

Figure 5:
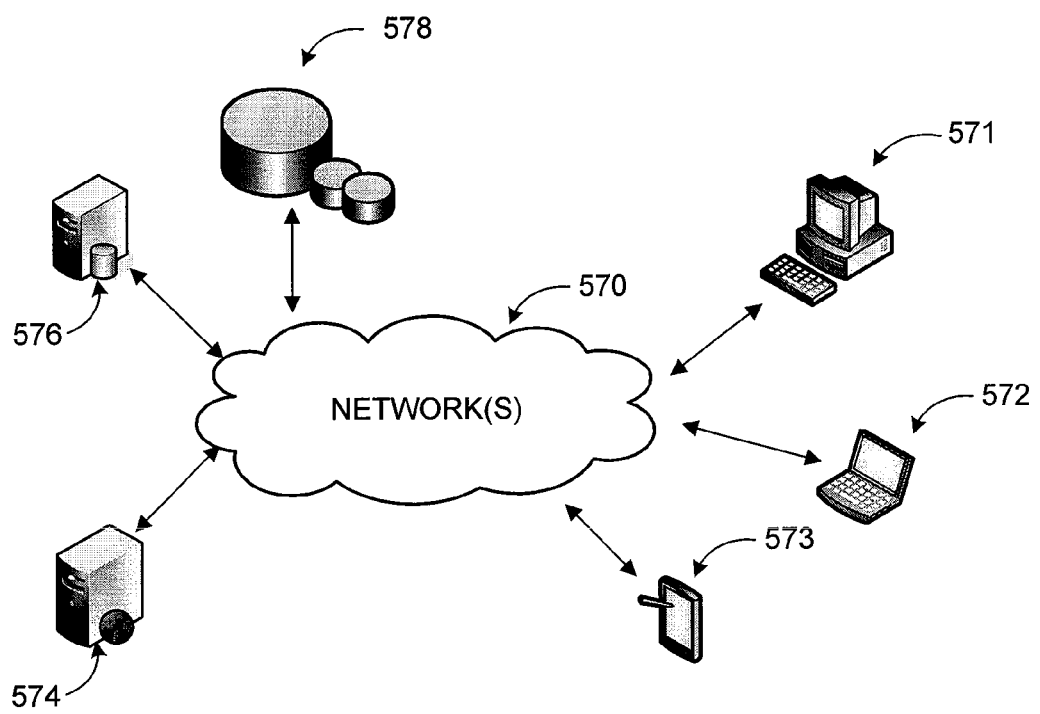
FIG. 5 illustrates a networked environment where embodiments may be implemented.

FIG. 5 is an example networked environment, where embodiments may be implemented. An application employing echo determination according to embodiments may be implemented locally or in a distributed manner over a number of physical and virtual clients and servers. It may also be implemented in un-clustered systems or clustered systems employing a number of nodes communicating over one or more networks (e.g. network(s) 570).

Such a system may comprise any topology of servers, clients, Internet service providers, and communication media. Also, the system may have a static or dynamic topology. The term "client" may refer to a client application or a client device. While a networked system implementing echo determination may involve many more components, relevant ones are discussed in conjunction with this figure.

Audio applications may be executed and audio captured/rendered in individual client devices 571-573. The users themselves or a third party provider may provide plug-ins for extended or additional functionality and audio processing in the client devices. If the audio application is part of a communication application (or service), the application or service may be managed by one or more servers (e.g. server 574). A portion or all of the audio may be stored in a data store such as data stores 578 and managed through database server 576 or accessed directly by the audio application(s).

Network(s) 570 may include a secure network such as an enterprise network, an unsecure network such as a wireless open network, or the Internet. Network(s) 570 provide communication between the nodes described herein. By way of example, and not limitation, network(s) 580 may include wired media such as a wired network or direct-wired connection, and wireless media such as acoustic, RF, infrared and other wireless media.

Many other configurations of computing devices, applications, data sources, data distribution systems may be employed to implement echo determination through sub-band adaptive filters in an audio application. Furthermore, the networked environments discussed in FIG. 5 are for illustration purposes only. Embodiments are not limited to the example applications, modules, or processes.

Figure 6:
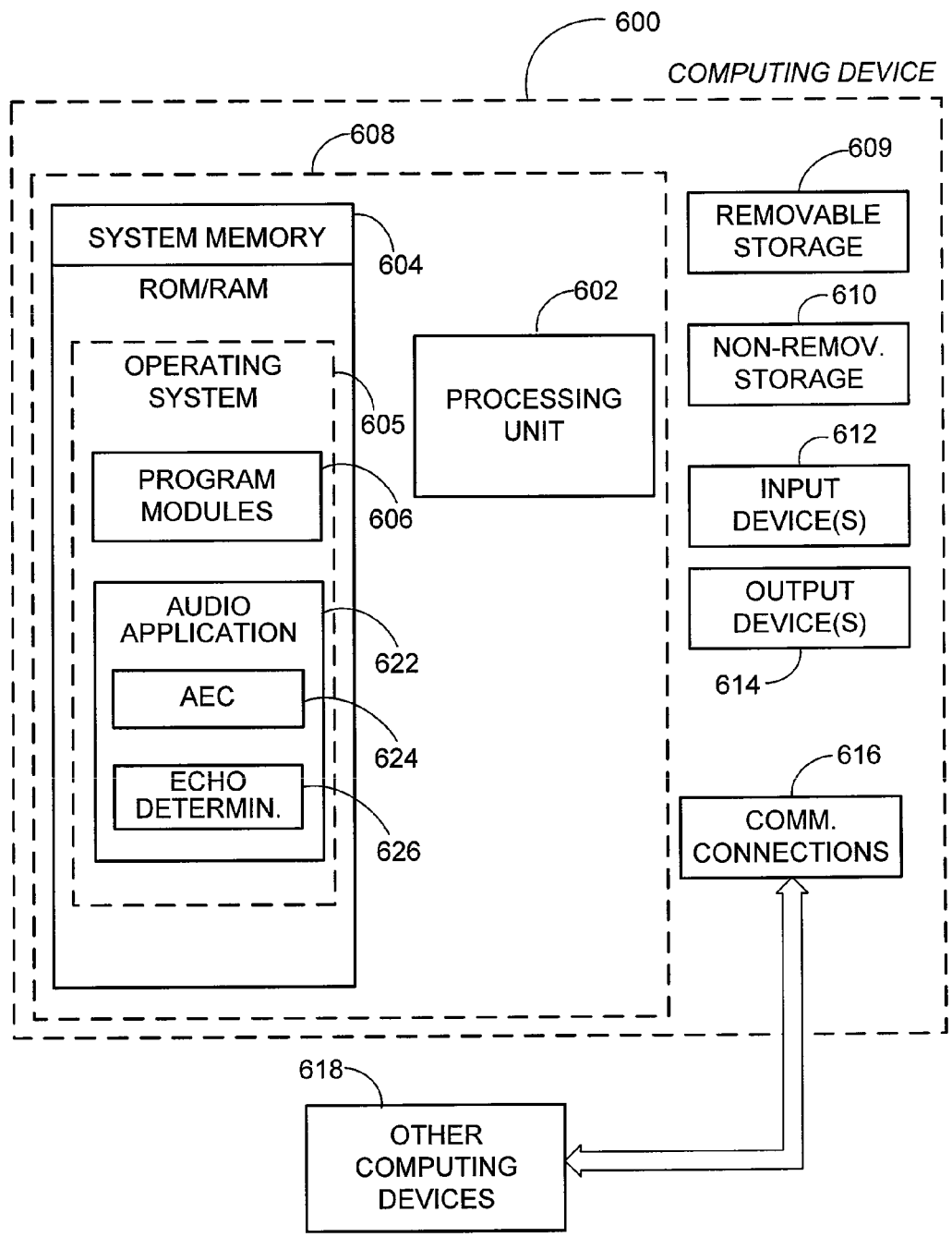
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a client device executing an audio application and typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the computing device, such as the WINDOWS® operating systems from MICROSOFT CORPORATION of Redmond, Wash. The system memory 604 may also include one or more software applications such as program modules 606, audio application 622, AEC module 624, and echo determination module 626.

Audio application 622 may be a separate application or an integral module of a hosted service application that provides two-way audio communication based on transmitted and received audio signals through computing device 600. AEC module 624 performs operations associated with reducing or preventing acoustic echo as discussed previously. Echo determination module 626 determines presence of echo employing sub-band adaptive filters and utilizing an ERLE computation as discussed above. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include client devices or server(s) that execute applications associated with receiving/providing audio signals from/to audio application 622 in computing device 600. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
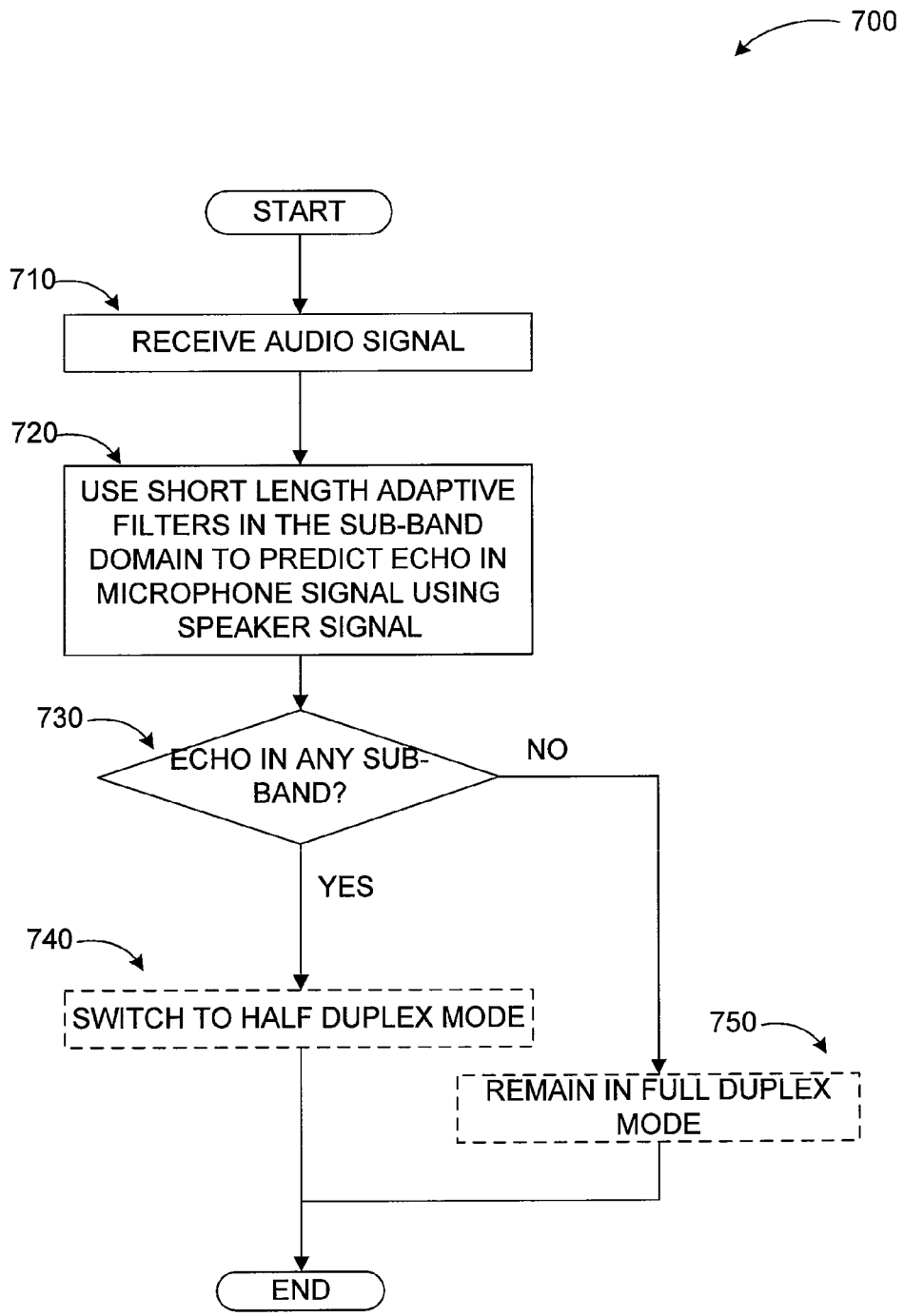
FIG. 7 illustrates a logic flow diagram for a process of detecting echo presence in a two-way communication system according to embodiments.

FIG. 7 illustrates a logic flow diagram for process 700 of determining echo presence in a voice conversation according to one example embodiment. Process 700 may be implemented, for example, as part of the audio application 622 of FIG. 6.

Process 700 begins with operation 710, where audio signal that may or may not include echo is received. A presence of echo, as discussed previously, may determine whether, a full-duplex communication mode is maintained, or a switch to half-duplex mode is made to preserve voice communication quality.

At operation 720, the signal is subjected to sub-band adaptive filtering in order to predict echo in the microphone signal using the speaker signal. As explained above, since the true physical delay between the timestamp adjusted speaker and microphone sub-band samples may be positive or negative, a search for this delay index is carried out by using the speaker signal delayed in either direction. According to one embodiment, a number of the short-band adaptive filters may be about 200 and their coefficients may be about 50 Hz apart. At decision operation 730, a determination is made, whether echo is detected through any of the filters. If echo is detected, processing moves to optional operation 740, where a switch to half-duplex communication may be made. If no echo is detected, communication in full-duplex mode may continue. Of course, other actions may also be taken in response to the determination of echo in the captured sound signal.

The operations included in process 700 are for illustration purposes. Determining echo presence may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed on a computing device for determining echo presence, the method comprising:
   receiving an input audio signal at a microphone associated with the computing device;
   converting the input audio signal to a microphone signal and providing the microphone signal to a processor of the computing device;
   determining a presence of echo in the input audio signal at the processor by predicting an echo signal component of the input audio signal employing short length adaptive filters and a speaker signal, wherein the speaker signal is received from a circuit providing the speaker signal to a speaker;
   aligning sub-band components of the input audio signal at the processor, mic[n,k], and the speaker signal, spk[n,k], based on timestamps associated with each component with n representing a timeframe index and k representing a sub-band frequency;
   predicting the echo signal component of the input audio signal at the processor, mic[n, k], based on past samples of the speaker signals {spk[n-d, k], spk[n-d-1, k], spk[n-d-2, k]}, where d=0, 1, 2, . . . L0, and L0 being a causal-delay search range;
   predicting the echo signal component of the input audio signal at the processor, mic[n-d, k], based on the speaker signals {spk[n, k], spk[n-1, k], spk[n-2, k]}, where d=1, 2, . . . L1, and L1 is acausal-delay search range;
   computing a prediction parameter Echo Return Loss Enhancement "ERLE" based on a variance quotient of the input audio signal at the processor, mic[n, k], mic[n, k]-mic[n,k, d], and a difference between mic[n, k] and the predicted echo signal component, mic[n, k, d] for causal and acausal ranges;
   determining a maximum ELRE across the sub-bands at the processor;
   comparing the maximum ERLE to a predefined threshold for determining the presence of the echo at the processor; and
   if the prediction indicates the presence of echo, implementing a predefined measure at the processor.

2. The method of claim 1, further comprising:
   if the prediction indicates the presence of echo, providing the input audio signal to an automatic echo cancellation (AEC) block.

3. The method of claim 1, wherein the predefined measure includes switching to half-duplex mode from full-duplex mode.

4. The method of claim 1, wherein variances of the echo signal component, mic[n, k], mic[n, k]-mic[n,k, d], and a difference between mic[n, k] and the predicted microphone signal, mic[n, k, d] are computed employing recursive averaging.

5. The method of claim 1, wherein a plurality of short-length adaptive filters is employed to predict the echo signal component.

6. The method of claim 5, wherein a number of the short-length adaptive filters is about 200.

7. The method of claim 5, wherein, sub-band coefficients of the short-length adaptive filters are about 50 Hz apart if the implementation is in the sub-band domain.

8. The method of claim 1, wherein the speaker signal is received from an automated gain control (AGC) block in a speaker signal path.

9. A computing device for facilitating two-way communication and determining echo presence in the two-way communication, comprising:
   a microphone
   a speaker;
   an audio processing module with a processing path for the microphone and another processing path for the speaker, the audio processing module configured to:
   receive an input signal from the microphone that includes a microphone signal and a potential echo signal coupled from the speaker;
   receive a speaker signal from a component on the speaker processing path as feedback;
   align sub-band components of the microphone signal and the speaker signal, respectively based on timestamps associated with each component;
   use a plurality of short length adaptive filters to predict an echo signal component of the microphone signal using the speaker signal, by performing a search across the filtered sub-band signals for a causal and an acausal delay range;
   determine a presence of the echo signal in the microphone signal based on the prediction
   compute a first parameter for measuring a first prediction ability based on determining variances of microphone signal and a difference between the microphone signal and the predicted microphone signal with delay for the causal delay range, and dividing the variances;
   compute a second parameter for measuring a second prediction ability based on determining variances of the microphone signal, the difference between the microphone signal and a predicted echo component in the microphone signal with delay for the acausal delay range, and dividing the variances; and determine a maximum value of the first and second parameters across sub-band range.

10. The computing device of claim 9, wherein the audio processing module is further configured to:

average maximum values of the first and second parameters across sub-band range;

compare the averaged maximum values of the first and second parameters to a first threshold; and if one of the averaged maximum values of the first and second parameters exceeds the first threshold, switch from a full-duplex communication mode to a half-duplex communication mode.

11. The computing device of claim 10, wherein the audio processing module is further configured to:

compare the averaged maximum value of the first and second parameters to a second threshold; and if the averaged maximum value of the first and second parameters exceeds the second threshold, forward the input signal to an AEC module for echo implementing canceling measures, wherein the second threshold is lower than the first threshold.

12. The computing device of claim 9, wherein the audio processing module at least partially comprises computer-readable instructions executed by a processor of the computing device for performing actions to determine the presence of echo.

13. A computer-readable memory device with instructions stored thereon for determining echo presence, the instructions comprising:

receiving a sampled version of an input signal from a microphone at a processor of the computer-readable memory device that includes a microphone signal, mic[n], and a potential echo signal, echo[n], coupled from the speaker;

receiving a sampled version of a speaker signal at the processor, spk[n], from a component on a speaker processing path prior to rendering of the speaker signal at the processor;

aligning sub-band components of frequency domain versions of the microphone signal and the speaker signal, mic[n, k] and spk[n, k], respectively based on timestamps associated with each component, wherein n represents a timeframe index and k represents a sub-band frequency with a maximum value of k being equal to a number of adaptive short-length filters for filtering each signal component at the processor;

predicting causal microphone signal at the processor, mic[n, k], based on past samples of the speaker signals {spk[n-d, k], spk[n-d-1, k], spk[n-d-2, k]}, where d=0, 1, 2, ... L0, and L0 being a causal-delay search range;

predicting acausal microphone signal at the processor, mic[n-d, k], based on the speaker signals {spk[n, k], spk[n-1, k], spk[n-2, k]}, where d=1, 2, ... L1, and L1 is acausal-delay search range; and determining a presence of echo based on a prediction parameter Echo Return Loss Enhancement "ERLE", ERLE[d, k] being computed through a variance quotient of microphone signal mic[n, k], a difference between microphone signal and predicted causal and acausal microphone signals, mic[n, k] and mic[n, k, d] at the processor.

14. The computer-readable memory device of claim 13, wherein the instructions further comprise:

determining the presence of echo based on selecting a maximum value of ERLE[d] for a plurality of values of a given delay index d, and comparing the maximum value of ERLE[d] to a predefined decision threshold for presence of echo, wherein ERLE[d] is defined as a maximum value of ERLE values across sub-band frequencies, maxkERLE[d, k].

15. The computer-readable storage medium memory device of claim 13, wherein the instructions are executed by at least one processor associated with one of: a computing device with audio capable peripherals, a hands free car communication system, a telephone-based communication system, a conference call system with integrated speaker and microphone, and a conference call system with separated speaker and microphone.

* * * * *